Jan. 21, 1958    R. B. WHITE    2,820,301
THROTTLE LEVER CHECKING GAUGE
Filed April 20, 1956    2 Sheets-Sheet 1
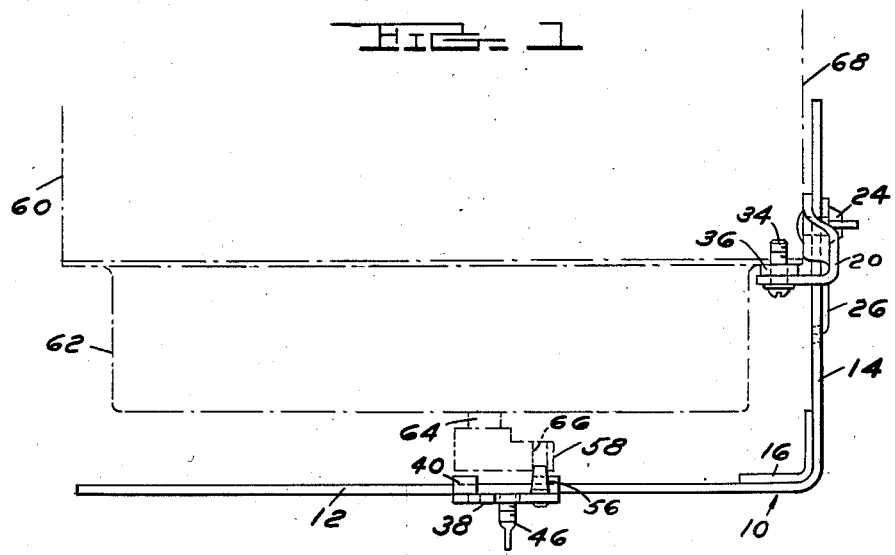
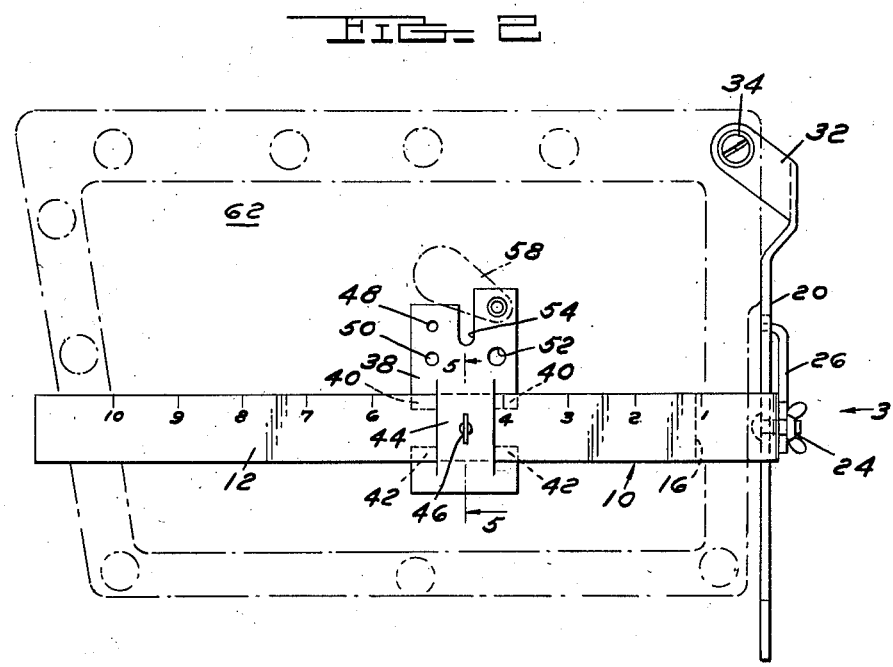
INVENTOR.
RICHARD B. WHITE
BY
Burton & Parker
ATTORNEYS Jan. 21, 1958 R. B. WHITE 2,820,301
THROTTLE LEVER CHECKING GAUGE
Filed April 20, 1956 2 Sheets-Sheet 2
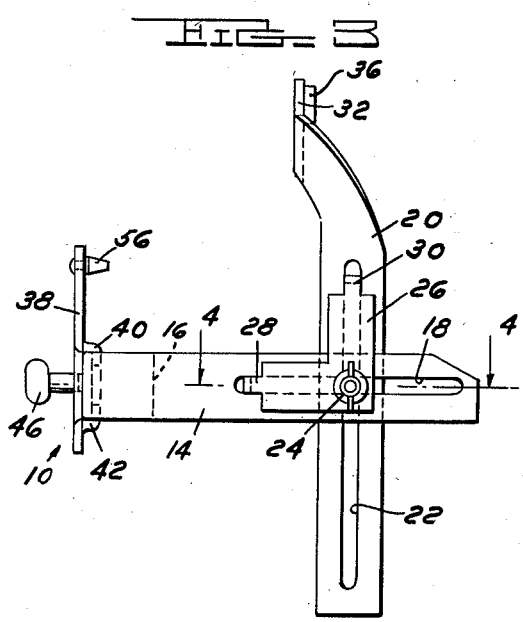
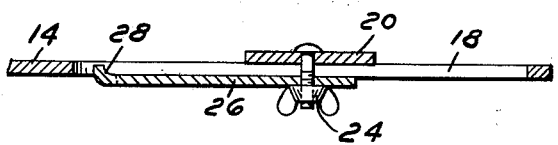
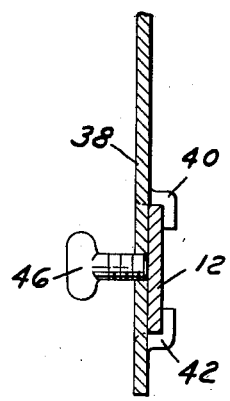
INVENTOR.
RICHARD B. WHITE
BY
Burton & Parker
ATTORNEYS

United States Patent Office 2,820,301
Patented Jan. 21, 1958

2,820,301

THROTTLE LEVER CHECKING GAUGE

Richard B. White, Munith, Mich., assignor to Kent-Moore Organization, Inc., Detroit, Mich., a corporation of Michigan Application April 20, 1956, Serial No. 579,495

9 Claims. (Cl. 33—181)

This invention relates to a gauge for checking the transmission throttle lever position on automotive automatic transmissions during repair or servicing of the automotive vehicle.

In general, automatic transmissions are provided with a throttle lever disposed exteriorly of the transmission and coupled by an actuating rod to the throttle of the engine at the carburetor. The lever is mounted on a lever supporting shaft which extends into the transmission and is coupled with the automatic gear changing mechanism. As the engine throttle is opened to speed up the engine, the lever on the transmission is moved, thereby rotating the shaft and effecting a change of gears in the transmission when the engine speed increases sufficiently, or for shifting to the "passing gear." In order for the lever of the transmission to properly control the gear changes in relation to the throttle opening at the carburetor, the relative rotational position of the lever on the shaft must be accurately preset. With the actuating rod between the transmission throttle lever and the carburetor disconnected, the throttle lever supporting shaft will assume a determined rotated position. It is then only necessary to accurately determine the position of the lever on the shaft in relation to some fixed part of the transmission in order to check the throttle lever position.

The principal object of the invention is the provision of a gauge for accurately determining the transmission throttle lever position with respect to a fixed portion of the transmission. A concomitant object is the provision of a universal gauge which will readily determine transmission throttle lever positions on a wide variety of transmissions. Being universal, the gauge eliminates the need for a special gauge for each application.

A further object of the invention is the provision of a gauge of the character mentioned which is positive in operation, easily assembled, disassembled, and installed for operation at a transmission, and is capable of manufacture at a low cost.

An advantage of the gauge is that it is fastened to the transmission during the gauging operation, leaving the operator's hands free to adjust the throttle lever to its proper setting as determined by the gauge.

Other objects, advantages and meritorious features of the invention will more fully appear from the following specification, appended claims and accompanying drawings, wherein:

Fig. 1 is a top view of a gauge embodying my invention showing it in relation to an automotive automatic transmission;

Fig. 2 is a side view of the gauge shown in Fig. 1 in relation to a transmission;

Fig. 3 is an end view looking in the direction of arrow 3 in Fig. 2 but omitting the transmission;

Fig. 4 is a cross sectional view taken on the line 4—4 of Fig. 3; and,

Fig. 5 is a cross sectional view taken on the line 5—5 of Fig. 2.

As shown in the drawings the gauge includes a generally L-shaped member 10 having a graduated or scaled arm 12 and an arm 14. A reinforcing fillet or the like 16 may be spot welded or otherwise secured in the corner of the L-shaped member 10. The arm 12 is graduated as shown in Fig. 2. The member 10 may be formed of metal or other suitable material, and preferably of a non-corrosive material such as an alloy of aluminum or the like.

The arm 14 is provided with a longitudinally extending slot 18 extending from adjacent the outer free end of the arm inwardly to a point beyond the mid point of the arm. A third arm or supporting member 20 provided with a longitudinally extending slot 22 is disposed in perpendicular relation to the arm 14 with a bolt and wing nut combination 24 received through slots 18 and 22 to hold arm 14 and member 20 in relative adjusted positions. Means is provided for insuring rectilinear movement between arm 14 and member 20. Such means cooperates with slots 18 and 22 and comprises an L-shaped plate 26 having ears 28 and 30 at the opposite free ends which are received within slots 18 and 22. The ears cooperate with the wing nut and bolt combination 24 to insure that the arm 14 and member 20 are held in perpendicular relation and move rectilinearly relative to each other.

The upper end of member 20 is angularly shaped as shown in Figs. 1, 2 and 3 with a portion 32 bent to lie in a plane normal to the plane of member 20. Portion 32 is provided with an aperture through which a bolt 34 extends with a spacer collar 36 encircling the bolt. The collar is so fastened to the bolt that the bolt will not accidentally become dislodged from member 20.

Mounted upon the graduated arm 12 of member 10 is a gauging plate or gauge carriage 38. The carriage is provided with opposed pairs of ears 40 and 42 spaced laterally out of the plane of the carriage and adapted to overlie the inner surface of arm 20 and cooperate with the portion 44 of the carriage to retain the carriage on the graduated arm 12. Locking means comprising a thumb screw or the like 46 is threaded through portion 44 of the carriage to bear against the graduated arm 12 to hold the carriage in adjusted positions longitudinally along arm 12.

The carriage 38 may be provided with a plurality of apertures 48, 50 and 52, together with a slot 54. The carriage may also be provided with an inwardly extending tapered pin 56. The apertures, slot and pin serve to facilitate coupling of the carriage with the transmission throttle lever indicated at 58.

A transmission housing 60 is schematically shown in Figs. 1 and 2. At one side of the housing is a cover 62 which houses automatic gear changing mechanism. Extending out through cover 62 of housing 60 is a shaft 64 upon which the throttle lever 58 is mounted. An actuating rod, not shown, is connected to the throttle lever 58 at an aperture 66 extending therethrough with the actuating rod connected at the opposite end to linkage coupled with the throttle at the carburetor. With the actuating rod disconnected from the throttle lever 58, the gauging operation is performed. In carrying out the gauging operation the operator refers to a chart indicating the distance that the throttle lever aperture 66 should lie from a determined or reference point on the transmission housing. Such reference point is generally taken to be the surface 68 of the transmission housing. The operator then sets the carriage 38 at such position along arm 12 that, for example, the pin 56 lies directly above the graduation on arm 12 indicating a proper distance for the throttle lever from surface 68. Screw 46 is thereafter tightened. The operator then removes the bolt at the upper corner of the cover 62 securing the same to the housing 60 and inserts in place of such bolt the screw 34, and draws the screw up tight. There upon the wing nut bolt combination 24 is loosened and the arm 12 positioned relative to the throttle lever such that the pin may be received within aperture 66 in the throttle lever 58. Thereafter the wing nut bolt combination 24 is tightened. Unless pin 56 is received within aperture 66 in the throttle lever without moving the throttle lever, the throttle lever is not properly positioned upon the shaft 64. The operator will effect the proper adjustment of throttle lever 58 upon shaft 64 such that the pin 56 may be received within the aperture without moving the lever. With this accomplished, the operator is assured that the throttle lever is properly positioned. The gauge is then removed from the transmission and the bolt at the upper corner of the cover 62 theretofore removed is replaced.

In certain instances the actuating rod is connected to the throttle lever 58 by a bolt, screw or the like. When such is the case, upon disconnecting the actuating rod, the bolt or screw is rethreaded back into the throttle lever and the slot 54 engaged with the bolt, and the bolt and slot accomplish the coupling of the gauge carriage to the throttle lever. The bolt or screw in the alternative may be received through one of the apertures 48—52. The gauging operation is in other respects similar to that above described.

What I claim is:

1. A gauging device for determining transmission throttle lever position on a transmission having a housing and a throttle lever comprising: a linearly extending arm adapted to be positioned to extend alongside the transmission housing adjacent the throttle lever, means connected to said arm and extending upwardly therefrom and adapted to be coupled to the transmission housing for positioning the arm as aforesaid, a gauging carriage mounted on the arm for shiftable movement therealong and for coupling with the throttle lever, means mounted on the carriage for fixedly positioning it longitudinally of the arm, and means for indicating determined positions of the carriage along the arm.

2. A gauging device for determining transmission throttle lever position on a transmission having a housing and a throttle lever comprising: a member having a pair of angularly related arms, means connected to one of said arms for coupling the member to the transmission housing with the other arm extending along adjacent the throttle lever, such latter arm provided with means to indicate positions therealong, a gauging carriage mounted for movement along such latter arm and provided with means for facilitating connection with the throttle lever, and locking means mounted on the gauging carriage to engage such latter arm and releasably hold the carriage at determined positions along the arm with reference to the position indicating means.

3. A gauging device for determining transmission throttle lever position on a transmission having a housing and a throttle lever comprising: a linearly extending arm, means connected to one end of said arm for coupling the same to the transmission housing, said means including a pair of slidably connected angularly related arms permitting bilateral adjustment of the first-mentioned arm relative to the transmission housing, the first-mentioned arm provided with means for coupling the arm to the throttle lever at determined intervals therealong.

4. A gauging device for determining transmission throttle lever position on a transmission having a housing and a throttle lever comprising: an L-shaped member having one arm graduated to indicate positions therealong, a supporting member connected to the other arm of the L-shaped member for adjustable movement longitudinally and transversely of the arm, said supporting member provided with means facilitating coupling thereof to the transmission housing, a gauging carriage mounted on the graduated arm and slidable therealong and adapted to be coupled with the throttle lever, and means coupled with the carriage for positioning the carriage longitudinally along the graduated arm.

5. A gauging device for determining transmission throttle lever position on a transmission having a housing and a throttle lever comprising: an L-shaped member having one arm graduated to indicate positions therealong, a supporting member connected to the other arm of the L-shaped member for determined rectilinear bilateral movement with respect to such arm and adapted to be coupled to the transmission housing, and a gauging carriage mounted for slidable movement longitudinally along the graduated arm and adapted to be coupled with the throttle lever.

6. A gauging device for determining transmission throttle lever position on a transmission having a housing and a throttle lever comprising: an L-shaped member having one arm graduated to indicate positions therealong, a supporting member connected to the other arm of the L-shaped member for adjustable movement transversely and longitudinally of such arm, means connected with such latter arm and the supporting member to provide rectilinear bilateral movement therebetween and position the supporting member and such latter arm in perpendicular relation, said supporting member provided with means facilitating coupling thereof to the transmission housing, a gauging carriage mounted on the graduated arm and slidable therealong and adapted to be coupled with the throttle lever, and means coupled with the carriage to position the same linearly along the graduated arm.

7. The invention as defined in claim numbered 6, characterized in that the latter arm of the L-shaped member is provided with a longitudinally extending slot and the supporting member is provided with a longitudinally extending slot, and said means for positioning such latter arm and the supporting member in perpendicular relation comprises a plate having a pair of ears at opposite ends received within said slots and screw threaded means extending through the plate and the slots and adjustably securing such latter arm and the supporting member and plate in adjusted relative positions.

8. A gauging device for determining transmission throttle lever position on a transmission having a housing and a throttle lever at one side thereof, comprising a linearly extending first arm adapted to be positioned to extend alongside the transmission housing adjacent the throttle lever and provided with means for coupling the arm to the lever at selected gauging intervals therealong, a laterally extending second arm connected to one end of the first arm and adapted to extend alongside an end face of the transmission housing, a third arm connected to the second arm and upstanding therefrom in perpendicular relation to the first arm and spaced laterally from the first arm along the second arm, means coupling two of the said arms together for rectilinear adjustment of said third arm toward and away from the first arm, and said third arm having a surface adapted to abut a locating surface at an end face of the transmission housing to position said first arm longitudinally of the housing.

9. The invention as defined in claim 8 characterized in that the said second and third arms are coupled together for rectilinear adjustment of the said third arm toward and away from the first arm.

References Cited in the file of this patent

UNITED STATES PATENTS

| 1,019,936 | Ware | Mar. 12, 1912 |
| 1,081,759 | Marchese | Dec. 16, 1913 |
| 1,489,933 | Duffy | Apr. 8, 1924 |
| 2,784,491 | Sankey | Mar. 12, 1957 |

FOREIGN PATENTS

| 552,930 | Great Britain | Apr. 30, 1943 |